MAGNETIC PULSE LIMITING

Filed June 28, 1954

INVENTOR.
Martin Kaplan
BY
Charles H. Brown
ATTORNEY

United States Patent Office 2,819,412

Patented Jan. 7, 1958

2,819,412

MAGNETIC PULSE LIMITING

Martin Kaplan, Collingswood, N. J., assignor to Radio Corporation of America, a corporation of Delaware Application June 28, 1954, Serial No. 439,560

10 Claims. (Cl. 307—88)

The invention relates to a method of and apparatus for obtaining pulses of equal amplitude from a source of pulses having a wide variation in amplitude, and particularly to magnetic means for limiting high current pulses obtained from low impedance sources.

Generally, limiting circuits utilize diodes that are designed to operate in connection with high impedance sources. Such circuits have a limited current-carrying capacity, stemming from the fact that the diodes can carry only a limited amount of current. To use diodes in connection with a low impedance source, it is necessary to transform the low impedance to a high impedance. Such a conversion necessarily results in a loss of power. The present invention overcomes these disadvantages by providing a more efficient match between a low impedance input source and the circuit utilizing such a source. The invention is particularly suitable for use as a voltage standardizing device for low impedance sources, such as a radar pulse source, although it has other uses as well.

An object of the invention is to provide a method of limiting high current pulses by utilizing the saturation characteristic of magnetic materials.

Another object of the invention is to provide a limiting circuit that has a relatively high current-carrying capacity.

Another object of the invention is to provide an improved limiting circuit for use with low impedance sources.

Briefly, the method according to the invention utilizes a ferrite or other type of magnetic core having a flat magnetization characteristic when saturated. At saturation, no additional magnetic flux is obtained from such a core by increasing the magnetizing force. The core is wound with an input winding, an output winding, and a bias winding. Direct current is applied to the bias winding so as to saturate the core in one direction. The pulses to be limited are applied to the input winding to saturate the core in the opposite direction. The pulses applied to the input winding induce currents in the output winding, which is connected to an integrating circuit from which voltage or current pulses of constant amplitude and time duration equal to that of the input pulses are derived. In order to produce output pulses that have a constant amplitude, it is necessary that each input pulse saturate the core in the direction opposite from saturation due to the applied bias. Since no additional magnetic flux is produced after the core is saturated, the output pulses, when integrated, have a constant amplitude.

The invention is explained in detail in the following description with reference to the accompanying drawing in which.

Figures 1, 2, 3, 4, 5:
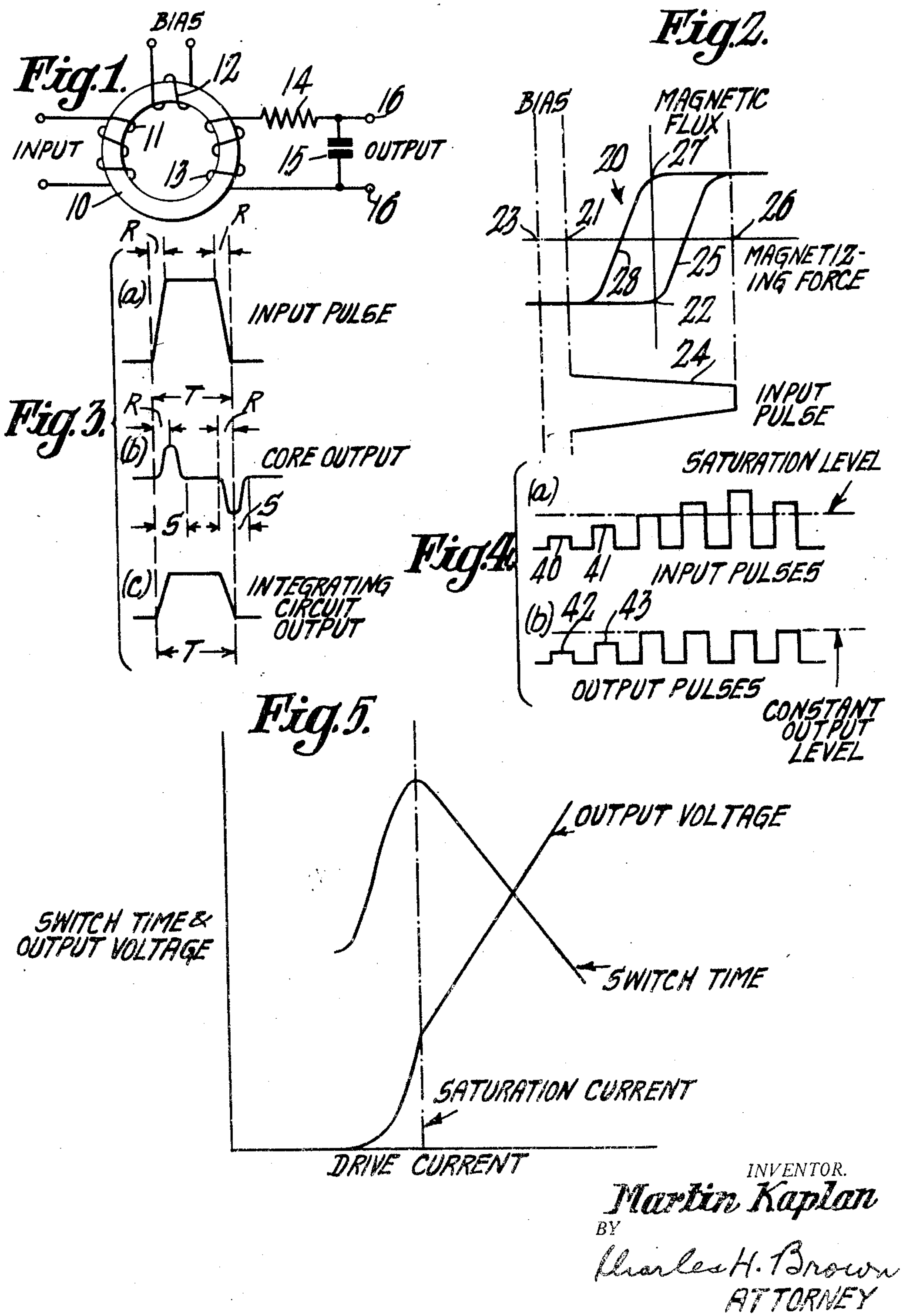
Figure 1 shows a magnetic core with the windings and integrating circuit.
Figure 2 shows a hysteresis loop for a core having a flat magnetization characteristic and below this hysteresis loop the waveform of an input pulse as applied to the arrangement of Figure 1.
Figure 3 shows three waveforms given in explanation of the operation of the arrangement of Figure 1.
Figure 4 shows examples of input and output pulses.
Figure 5 shows the graphic relation between the drive current and the output voltage and switch time of the magnetic core.

In Figure 1, a toroidal core 10 is shown having an input winding 11, a bias winding 12, and an output winding 13. The bias winding 12 is so wound that direct current applied to the bias winding 12 biases the core 10. The input winding 11 and the output winding 13 are so wound and positioned that each pulse applied to the input winding 11 induces two narrower pulses of opposite polarities in the output winding 13. The core 10 is made of a magnetic material, such as ferrite or 4–79 Molly-Permalloy, which has a flat magnetization characteristic. An integrating circuit having a resistor 14 and a capacitor 15 is connected to the output winding 13. The resistor 14 is connected between one side of the output winding 13 and one of the output terminals 16. A direct connection is made between the other side of the output winding and the other output terminal. The capacitor 15 is connected between the output terminals 16.

A hysteresis loop 20 for a core having a flat magnetization characteristic is shown in Figure 2. A bias of some value 21 is applied to the magnetic core, as by the bias winding 12 shown in Figure 1, so that the core is saturated at some value 22 in one direction. When a core having a flat magnetization characteristic is so saturated, no additional magnetic flux is produced by increasing the magnetizing force on the core. That is, the value 22 of the magnetic flux will not be appreciably increased by increasing the bias to some greater value 23 in the same direction. When an input pulse 24 of the proper direction is applied to the magnetic core, as by the input winding 11 shown in Figure 1, the core will tend to produce magnetic flux that is opposite in direction to the flux produced by the bias. When being switched from one direction to the opposite direction of magnetization, the core follows a path 25 until the input pulse 24 reaches some value 26, so that the core is saturated at some value 27 in the opposite direction. The value 27 of the magnetic flux is not appreciably increased by increasing the input pulse to some greater magnitude. As the input pulse falls, the core tends to produce magnetic flux in the original direction by following a different path 28. Thus, the magnetizing force on the core 10 is varied between saturation in one direction and saturation in the opposite direction, and the magnetic flux produced by the core 10 varies between two steady values 22 and 27. In order for proper limiting to take place, it is necessary that the steady bias value 21 and the maximum pulse value 26 of the input pulse saturate the core 10 in opposite directions. Within limits, adjustment of the bias value 21 is one way of attaining this condition. Once the core is saturated by the input pulse, any additional magnetizing force produced by input pulses of greater amplitude does not produce additional magnetic flux to induce additional current in the output winding.

Figure 3 shows waveforms explaining the operation of the arrangement of Figure 1. Figure 3(*a*) shows the waveform of an input pulse applied to winding 11 and having a period T and a transition time R. Figure 3(*b*) shows the waveform of an output wave appearing across the output winding 13 before being integrated. The switch time S is the time during which the core 10 departs from its steady-state condition. During the steady-state condition, no change of flux occurs in the core 10. This switch time S causes the core 10 to require an additional amount of time to return to its steady-state condition after the period T. The transition time R must be less than the switch time S of the core 10. Likewise, the width or duration of the input pulses should be sufficient to allow the core to return to its steady-state condition after a transition in one direction before the core is subjected to a transition in the opposite direction. This is necessary to prevent the core being subjected to unsymmetrical forces by the rise and fall of the input pulses which occur at different positions on the hysteresis loop of the core. The integrating circuit output obtained from the output terminals 16 is shown in Figure 3(c). If the input pulse has too long a period (duration) T, drop off of the pulse amplitude at the integrating output terminals 16 becomes appreciable. Consequently, the discharge time of the integrating circuit including the capacitor 15 must be considerably longer than the period T of the input pulse. Since the condition for proper limiting is that the core 10 be varied between opposite directions of saturation, any additional increase in magnetizing force caused by input pulses of amplitude greater than that necessary to produce saturation of the core does not produce additional magnetic flux at the output terminals of the winding 13. By integrating the output from winding 13, pulses of constant amplitude will be derived.

Figure 4 shows examples of input pulses and output pulses as applied and produced by the arrangement in Figure 1. Figure 4(a) depicts a series of applied input pulses, of which the first two 40 and 41 have insufficient amplitude to saturate the core 10 in a direction opposite to the saturation produced by the steady bias. Figure 4(b) depicts the series of output pulses obtained from the output terminals 16 as a result of the application of the input pulses of Figure 4(a). Since the first two input pulses 40 and 41, shown in Figure 4(a) do not saturate the core 10, the corresponding output pulses 42 and 43 in Figure 4(b) do not have the constant amplitude that the succeeding output pulses have. Only those input pulses which have sufficient amplitude and duration to saturate the core 10 will produce output pulses of constant amplitude.

Figure 5 shows the graphic relation between the drive current and the output voltage and switch time of a ferrite core. At saturation, such a core has output voltage and switch time characteristics which are inversely proportioned to each other. In other words, the change in flux is constant at saturation, and this requires that the integrated value of the voltage over the switch time be constant. If the input pulses saturate the core 10 and if the transition time R is less than the inherent switch time S of the particular core used, then the integrated output for input pulses greater than the saturation level will be constant.

What is claimed is:

1. A magnetic limiting circuit for producing pulses of constant amplitude in response to applied pulses of varying amplitude comprising a magnetic core having a flat magnetization characteristic, means for biasing said core to saturation in one direction, an input winding coupled to said core for applying said pulses of varying amplitude to saturate said core in the opposite direction, an output winding coupled to said core, and an integrating circuit connected to said output winding for producing said pulses of constant amplitude.

2. A magnetic limiting circuit for producing pulses of constant amplitude in response to applied pulses of varying amplitude comprising a magnetic core having a flat magnetization characteristic and an inherent switch time greater than the transition time of said pulses of varying amplitude, a bias winding wound on said core, means for applying a bias current to said bias winding to saturate said core in one direction, an input winding wound on said core, means for applying said pulses of varying amplitude to said input winding to saturate said core in the opposite direction, an output winding wound on said core, and an integrating circuit connected to said output winding for producing said pulses of constant amplitude.

3. A magnetic limiting circuit for producing pulses of constant amplitude in response to applied pulses of varying amplitude comprising a magnetic core having a flat magnetization characteristic and an inherent switch time greater than the transition time of said pulses of varying amplitude, a bias winding wound on said core, means for applying a bias current to said bias winding to saturate said core in one direction, an input winding wound on said core, means for applying said pulses of varying amplitude to said input winding to saturate said core in the opposite direction, an output winding wound on said core, output terminals, and an integrating circuit connected between said output winding and said output terminals for producing said pulses of constant amplitude, said circuit having a resistor serially connected between one side of said winding and one of said terminals, a direct connection between the other side of said winding and the other of said terminals, and a capacitor connected between said output terminals.

4. A magnetic limiting circuit for producing pulses of constant amplitude in response to applied pulses of varying amplitude comprising a magnetic core having a flat magnetization characteristic and an inherent switch time greater than the transition time of said pulses of varying amplitude, a bias winding wound on said core, means for applying a bias current to said bias winding to saturate said core in one direction, an input winding wound on said core, means for applying said pulses of varying amplitude to said input winding to saturate said core in the opposite direction, an output winding wound on said core, output terminals, and an integrating circuit connected between said output winding and said output terminals for producing said pulses of constant amplitude, said circuit having a resistor serially connected between one side of said winding and one of said terminals, a direct connection between the other side of said winding and the other of said terminals, and a capacitor having a discharge time greater than the duration of said applied pulses connected between said output terminals.

5. A limiting circuit in accordance with claim 1, wherein said core is made of a ferrite material, and said means for biasing said core includes a source of D.-C. potential.

6. A magnetic circuit for producing pulses in response to applied pulses of varying amplitude comprising a magnetic core having a flat magnetization characteristic, means for biasing said core to produce magnetic flux in one direction, an input winding coupled to said core for applying said pulses of varying amplitude to excite said core to produce magnetic flux in the opposite direction, an output winding coupled to said core, and an integrating circuit connected to said output winding for producing said pulses.

7. A magnetic device comprising a magnetic core, a biasing coil coupled to said core, an input coil coupled to said core, means for applying direct current to said biasing coil to produce magnetic flux in one direction, means for applying a signal to said input coil to produce magnetic flux in an opposing direction, an output coil coupled to said core, and an integrating circuit coupled to said output coil.

8. A magnetic device comprising a magnetic core, a biasing coil coupled to said core, an input coil coupled to said core, means for applying direct current to said biasing coil to produce magnetic flux in one direction, means for applying a pulse waveform to said input coil to produce magnetic flux in an opposing direction, an output coil coupled to said core, and an integrating circuit coupled to said output coil, said integrating circuit having a discharge time longer than the duration of the pulses in said waveform.

9. A magnetic device comprising a magnetic core, means for biasing said magnetic core to saturation in one direction, an input coil coupled to said core, means for applying a signal to said input coil to produce magnetic flux in an opposite direction, an output coil coupled to said core, and an integrating circuit coupled to said output coil.

10. A magnetic device comprising a magnetic core, said magnetic core having a substantially flat magnetization characteristic, means for biasing said magnetic core to saturation in one direction, an input coil coupled to said core, means for applying a signal to said input coil to produce magnetic flux in said core in an opposite direction, an output coil coupled to said core, and an integrating circuit coupled to said output coil.

No references cited.

Notice of Adverse Decision in Interference

In Interference No. 90,134 involving Patent No. 2,819,412, M. Kaplan, Magnetic pulse limiting, final judgment adverse to the patentee was rendered Aug. 29, 1962, as to claims 7 and 8.

[*Official Gazette December 4, 1962.*]

Disclaimer 2,819,412.—*Martin Kaplan*, Collingswood, N.J. MAGNETIC PULSE LIMITING. Patent dated Jan. 7, 1958. Disclaimer filed Nov. 8, 1962, by the assignee, *Radio Corporation of America.*

Hereby enters this disclaimer to claims 7 and 8 of said patent.

[*Official Gazette January 15, 1963.*]